US012612089B2

(12) United States Patent
Vorren et al.

(10) Patent No.: US 12,612,089 B2
(45) Date of Patent: Apr. 28, 2026

(54) MONITORING PASSING TRAINS, SYSTEM AND METHOD

(71) Applicant: KONUX GMBH, Munich (DE)

(72) Inventors: Ole Tommy Vorren, Munich (DE); Olav Stetter, Munich (DE)

(73) Assignee: KONUX GMBH, Munich (DE)

( * ) Notice: Subject to any disclaimer, the term of this patent is extended or adjusted under 35 U.S.C. 154(b) by 485 days.

(21) Appl. No.: 18/245,252

(22) PCT Filed: Sep. 10, 2021

(86) PCT No.: PCT/EP2021/074980
§ 371 (c)(1),
(2) Date: Mar. 14, 2023

(87) PCT Pub. No.: WO2022/053638
PCT Pub. Date: Mar. 17, 2022

(65) Prior Publication Data
US 2023/0356763 A1      Nov. 9, 2023

(30) Foreign Application Priority Data

Sep. 14, 2020    (EP) .................................... 20195920

(51) Int. Cl.
*G01M 17/10*          (2006.01)
*B61L 25/02*          (2006.01)
(52) U.S. Cl.
CPC ........... *B61L 25/021* (2013.01); *G01M 17/10* (2013.01)
(58) Field of Classification Search
CPC ........ B61L 1/163; B61L 25/04; B61L 25/021; B61L 23/047
See application file for complete search history.

(56) References Cited

U.S. PATENT DOCUMENTS 10,040,465 B2    8/2018  Mian
2012/0217351 A1   8/2012  Chadwick
(Continued)

FOREIGN PATENT DOCUMENTS

CN        102343922 A     2/2012
DE     102016108273 A1    11/2017
(Continued)

OTHER PUBLICATIONS

International Search Report dated Dec. 9, 2021, for corresponding PCT Application No. PCT/EP2021/074980.

*Primary Examiner* — Jennifer Bahls
(74) *Attorney, Agent, or Firm* — Tarolli, Sundheim, Covell & Tummino LLP

(57)                ABSTRACT
The present invention relates to a method for analyzing properties related to a passing train on a railway network, method comprising collecting a first sensor data of railway at a first time via a least one sensor arranged on the railway network, processing the first sensor data via at least one processing component to generate at least one processed sensor dataset, and estimating a value of at least one property related to the passing train based on the at least one processed sensor data to generate at least one property estimation of the passing train. The invention also relates to a system for analyzing properties related to a passing train on a railway network, the system comprising at least one sensor configured to measure at least one property related to the passing train, at least one processing component configured to process the at least one property related to the passing train, at least one analyzing component configured to analyze the at least one property related to the passing train, and at least one interface configured to access at least one server configured to be bidirectionally connected to the system, wherein the system is configured to estimate a value
(Continued)

of the at least one property related to the passing train based on the at least one property.

17 Claims, 3 Drawing Sheets

(56)                References Cited

U.S. PATENT DOCUMENTS

2021/0261177 A1 *  8/2021  Lata ........................ B61L 27/53
2023/0222271 A1 *  7/2023  Spackova ............... G06F 30/27
                                                703/1

FOREIGN PATENT DOCUMENTS

EP          1274979  B1     1/2003
WO        2020002018  A1     1/2020
WO        2021155950  A1     8/2021

* cited by examiner

MONITORING PASSING TRAINS, SYSTEM AND METHOD

RELATED APPLICATIONS

The present application is a U.S. National Stage application under 35 USC 371 of PCT Application Serial No. PCT/EP2021/074980, filed on 10 Sep. 2021, which claims priority to EP patent application No. 20195920.2, filed on 14 Sep. 2020, the entirety of each of which is incorporated herein by reference.

FIELD

The invention lies in the field of monitoring railway networks and particularly in the field of monitoring rolling units on railway networks. The goal of the invention is to provide a method for monitoring a passing train on a railway network. More particularly, the present invention relates to a system for monitoring and detecting the speed of a passing train and the health status of components of the passing train, a method performed in such a system and corresponding use of a system.

BACKGROUND

Railroad, railway or rail transport has been developed for transferring goods and passengers on wheeled vehicles on rails, also known as tracks. In contrast to road transport, where vehicles run on a prepared flat surface, rail vehicles (rolling stock) are directionally guided by the tracks on which they run. Tracks commonly consist of steel rails, installed on ties or sleepers and ballast, on which the rolling stock, usually provided with metal wheels, moves. Other variations are also possible, such as slab track, where the rails are fastened to a concrete foundation resting on a subsurface.

Rolling stock in a rail transport system generally encounters lower frictional resistance than road vehicles, so passenger and freight cars (carriages and wagons) can be coupled into longer trains. Power is provided by locomotives, which either draw electric power from a railway electrification system or produce their own power, usually by diesel engines. Most tracks are accompanied by a signaling system. Railways are a safe land transport system when compared to other forms of transport. Additionally, railways are capable of high levels of passenger and cargo utilization and energy efficiency but are often less flexible and more capital-intensive than road transport, when lower traffic levels are considered.

Railway operations require careful monitoring and control of the conditions of the railway infrastructure to ensure passenger safety and reliable service. Many sensors are used to monitor and obtain data from different infrastructural component of the railway network, which may be used to ensure the integrity of the service and identify possible sources of malfunction. Such sensors allow for data collection and analysis and ensure safer operations of railways. Various sensors can be placed directly on trains, on tracks or nearby, at train stations and/or on platforms, and generally in the overall vicinity of the railway.

With the increase in rail traffic, rail system is under increasing pressure to keep the trains running on time and for longer. Safety, availability and reliability are the main components of a comfortable rail traffic. A system and method for analyzing the rail related data which fully integrates the type of the train, their location speed will help in understanding delays, infrastructural malfunctioning, etc. The International Union of Railways (IUR), the Community of European Railways (CER), the International Union of Public Transport (IUPT) and the Union of European Railway Industries (UNIFE) have all agreed, within the White Paper for European Transport, to attempt to increase the market share of goods traffic on rail from 8% in 2001 to 15% in 2020 (European Union, 2011). This will of course lead to an increase in railway traffic hence number of trains. Knowing the speed of a passing train will help in establishing the state of both the train itself and of the track, as well as knowing ancillary information about the train, such as its location, ETA, collision susceptibility, etc.

As the number of trains increases so will the data one can use from them. For example, the vibrations induced by the motion of the train via the interaction between wheel and rail tracks. This vibrational data can be used to extract a plurality of information, for example, rail and track bed condition, vehicle suspension, wheel condition, speed, weight of the vehicle, material used in tracks, depth to water table, frost depth, type of the vehicle, etc.

A system and/or a method which will be able to analyze this vibration signal will not only be able to provide the information about the wheels and the rail tracks but also the vehicle passing by and the traffic associated with the vehicle. As a person skilled in art may now infer that the nature of vibrations and the associated data will differ depending on the point where they are recorded. A few vibration/oscillation-based studies of railway related data have been done.

EP1274979B1 relates to a method for monitoring the travelling behavior of rail vehicles, according to which an oscillation behavior of at least one vehicle component is monitored by detecting at least one oscillation pattern and comparing the same with at least one reference oscillation pattern, whereby a natural oscillation of at least one vehicle component is monitored. The invention also relates to a device for monitoring the travelling behavior of rail vehicles, whereby at least one oscillation pick-up is mounted on at least one vehicle component. To this end, means are provided for evaluating the signal pattern, which is supplied by at least one oscillation pick-up, whereby characteristic values of the oscillation patterns of the at least one vehicle component are detected and compared with reference characteristic values of the oscillation patterns of a natural oscillation of the vehicle component.

CN102343922 provides an on-line monitoring system for vibration characteristics of a rapid railway turnout based on a wireless sensor network and relates to the technical field of safety monitoring of rapid railway infrastructures. The wireless sensor network serves as the core of a special system. The on-line monitoring system comprises a data monitoring unit for front-end three-shaft acceleration wireless sensor, a front-end data collecting unit for the wireless sensor network and a server terminal, wherein the data monitoring unit for front-end three-shaft acceleration wireless sensor is used for on-line acquiring a vibration data of a rapid turnout when a train passes by and sending the vibration data in a wireless mode; the front-end data collecting unit for the wireless sensor network is used for receiving the data sent by the data monitoring unit in real time and collecting and transferring the data; and the server terminal is used for receiving the data from the front-end data collecting unit, permanently storing the data, analyzing and calculating to obtain a train speed and a load condition according to the acceleration data, comparing the train speed and the load condition with a historic statistical data, and prompting and alarming for parameters which deviate from the historic statistical data and exceed a certain scope, thereby supporting the safety running of the rapid turnout. Combined with a conventional test and mechanical analysis method, the on-line monitoring system can be used for monitoring the rapid railway turnout and providing a data basis for maintaining and design optimizing of the turnout.

SUMMARY

In light of the above, it is an object of the present invention to overcome or at least alleviate the shortcomings of the prior art. More particularly, it is an object of the present invention to provide a method and system for analyzing vibration signal data to related to properties of a passing train on a railway network.

These objects are met by the present invention.

In a first aspect, the invention relates to a method for analyzing properties related to a passing train on a railway network, the method comprising collecting a first sensor data of railway at a first time via a least one sensor arranged on the railway network, processing the first sensor data via at least one processing component to generate at least one processed sensor dataset, and estimating a value of at least one property related to the passing train based on the at least one processed sensor data to generate at least one property estimation of the passing train.

The value of the at least one property of the passing train may comprise a speed of the passing train, and wherein the at least one property estimation may comprise at least one speed estimation of the passing train.

In one embodiment, the method may further comprise predicting the speed of the passing train based on the at least one sensor data to generate at least one speed prediction of the passing train.

Furthermore, the method may comprise may further comprise connecting the at least one sensor to at least one server.

In one embodiment, the method may comprise retrieving at least one vibration signal.

The method may further comprise extracting at least one Power Spectral Density (PSD) data set from the least one vibration signal.

In one embodiment, the at least one vibration signal returns a PSD as at least one-dimensional vector of a fixed size.

The at least one acceleration signal may comprise a signal frequency signal and a sampling rate, wherein the signal frequency may be between 0 and 10,000 Hz, preferably between 50 and 8,000 Hz, more preferably between 100 and 5,000 Hz, and wherein the sampling rate may be between 0 and 20 kHz, preferably between 0.1 and 8 kHz, more preferably between 1 and 5 kHz.

In one embodiment, the method may comprise extracting at least one Mel spectrogram from the least one vibration signal.

The method may comprise mapping the data to generate a mapped data set.

Furthermore, the method may comprise curating the at least one estimation of the train speed based on the mapped data.

In one embodiment, the method may comprise bidirectionally connecting the at least one sensor to the at least one server.

Moreover, the method may comprise connecting the at least one server with the at least one processing.

In one embodiment, at least one of the at least one server may comprise at least partially one of the least one processing component.

The method may comprise facilitating the at least one sensor with a sensor processing component.

In one embodiment, the at least one processing component may comprise a memory component configured to store at least one of the first sensor data, and the at least processed sensor data.

The sensor processing component may comprise a sensor memory component configured to store at least one of the first sensor data, and the processed sensor data.

In one embodiment, the method may further comprise retrieving from the at least one sensor at least one of the first sensor data, and at least one sensor ID, and supplying to the at least one server at least one of the first sensor data, and the at least one sensor ID, wherein the at least one sensor ID may be related to the at least one sensor.

The at least one vibration signal may comprise at least one of: at least frequency data, at least displacement data, at least velocity data, at least acceleration data.

The method may further comprise automatically generating at least one acceleration trace associated with the first sensor data.

In one embodiment, method may comprise automatically transmitting to the at least one processing component at least one of the first sensor data, and the at least processed sensor data.

Moreover, the method may comprise pre-processing the via the at least processing component the first sensor data.

In one embodiment, step of pre-processing may further comprise at least one of: flagging at least one noisy component of the first sensor data, removing at least one exponential wakeup, cutting off the edge of the at least one acceleration trace, stretching the at least one first sensor data to a pre-determined size, representing the at least one first sensor data as a time-frequency spectrogram.

The step of flagging may comprise automatically deleting at least a pre-determined section of the acceleration trace.

In one embodiment, the method may further comprise the step of automatically calculating the pre-determined section according to a type of the passing train.

Moreover, the step of flagging may further comprise altering the at least one acceleration trace when a root mean square (RMS) value of the acceleration may be lower than a threshold value.

Additionally or alternatively, the step of removing the exponential wakeup may comprise alteration of an automatically pre-calculated number of acceleration trace/s from the acceleration trace.

In one embodiment, the method may further comprise the step of automatically identifying the pre-generated number preferably by fitting exponential curve to the acceleration trace and differentiating between a real signal and a wakeup curve.

The method may further comprise the step of cleaning at least one additive noise, preferably by implementing a wiener filter.

The method may further comprise dynamically extracting at least one temporal and spectral content to standardize an output to a fixed size, and automatically converting the at least one acceleration trace to at least one time-frequency spectrogram.

The method comprising scaling the at least spectrogram value within a pre-determined region.

In one embodiment, the method comprising generating at least one spectrogram parameter preferably using hyperparameter optimization on at least one pre-determined truth dataset.

The method may further comprise facilitating the at least one processing component with at least one neural network component.

In one embodiment, the method may comprise feeding into the at least one neural network component at least one pre-processed dataset of the first sensor data.

The at least one neural network may comprise at least one convolutional neural network layer.

In another embodiment, the method may comprise automatically extracting at least one feature map from at least one of the first sensor data, and the at least processed sensor data.

The method may comprise using the outcome of the pre-processing step for predicting the speed of the passing train.

In one embodiment, the method may further comprise using the outcome of the pre-processing for embedding the at least one acceleration trace in the feature map.

In another embodiment, the method may comprise automatically extracting a feature map related to an observed environment of the at least one sensor.

The method may comprise facilitating the at least one neural network component to automatically learn at least one lower-dimensional feature map.

In one embodiment, the method may comprise teaching the at least one neural network component the at least one lower-dimensional feature map, wherein the method may further comprise associating at least one weight with at least one distinctive feature of the passing train.

In another embodiment, the method may further comprise unsupervised encoding of the at least one spectrogram to the at least one feature map.

Moreover, the method may further comprise down-sampling of the feature map preferably via convolution.

The method may further comprise applying at least one activation function to the at least one feature map.

The method may comprise teaching the at least one neural network the at least one feature of the passing train using at least one training database.

The method may comprise generating a health status hypothesis of at least one component of the passing train.

The at least one component may be at least one wheel of the passing train.

In one embodiment, the health status hypothesis of the at least one wheel may be used to identify a flat wheel.

Furthermore, the health status hypothesis may further comprise at least one flat wheel cause.

In one embodiment, the method may further comprise generating at least one suggestion procedure, wherein the at least one suggestion procedure may comprise at least one action to remediate the at least one flat wheel.

The method may further comprise prompting a user to implement at least one of the at least one suggestion procedure and/or at least one of the at least one action.

In one embodiment, the method may further comprise transforming the acceleration trace via at least one transforming approach of scaling, log scaling, variance normalization, Mel spectrogram, and sequence of power spectral density vectors, wherein the method may comprise automatically generating a transformed acceleration trace dataset.

In one embodiment, the method may comprise counting at least one of axle and wagon, wherein the method may comprise assigning a unique ID to each of the at least one axle and at least one wagon, wherein the unique ID may be assigned based on a passing order, wherein the passing order may comprise a passing sequence of the at least one axle and/or at least one wagon over the at least one sensor.

The counting may be based upon transformed acceleration trace dataset.

In one embodiment, the method may comprise collecting at least a second sensor data of railway at at-least a second time via the least one sensor arranged on the railway network, processing the at least second sensor data via the at least one processing component, and estimating at least a second value of the at least one property related to the passing train based on the at least second processed sensor data.

The first sensor data may be different from the at least second sensor data.

In one embodiment, the first time may be different from the at least second time.

The method may comprise tracking the health status of the at least one component of the passing train across at least 2 sensors.

In one embodiment, the health status hypothesis may comprise information related to the at least one axle, wherein the method may comprise estimating a specific axle of the passing train to generate a first axle finding, correlating the first axle finding to the unique ID of the at least one axle, and generating at least one final axle finding may comprise the health status of the at least one axle.

The method may comprise automatically reporting the unique ID of the at least one axle may comprise a flat wheel.

In one embodiment, the method may comprise automatically identifying the unique ID of the at least one axle may comprise the flat wheel across the at least 2 sensors, preferably across at least 3 sensors, more preferably across at least 4 sensor components.

In a second aspect, the invention relates to a system for analyzing properties related to a passing train on a railway network, the system comprising at least one sensor configured to measure at least one property related to the passing train, at least one processing component configured to process the at least one property related to the passing train, at least one analyzing component configured to analyze the at least one property related to the passing train, and at least one interface configured to access at least one server configured to be bidirectionally connected to the system, wherein the system may be configured to estimate a value of the at least one property related to the passing train based on the at least one property.

The system may be configured to execute the method according to any of the preceding method embodiments.

The value of the at least one property related to the passing train may comprise an estimate of the speed of the passing train.

In one embodiment, the system may be configured to establish a bidirectional communication between the at least one server and the at least one sensor.

The system may further be configured to enable a bidirectional data exchange between the at least one server and at least one of the least one sensor.

In one embodiment, the least one processing component may be arranged on at least one of the at least one the server, and the at least one sensor.

The at least one processing component may comprise at least one memory component configured to store at least one of the first sensor data, the at least processed sensor data, the at least second sensor data, and the at least second processed sensor dataset.

The first data may comprise vibration signal associated with a motion of the passing train. It should be understood that the passing train may also comprise a plurality of passing trains and that the motion may also be the motion of at least one passing train and/or at least one of the at least one passing train. Therefore, the passing train in the present invention may also be intended to refer to at least one passing train.

The vibration signal may comprise at least one of: at least one frequency data, at least one displacement data, at least one velocity data, at least one acceleration data.

The at least one processing component may be configured to pre-process at least one of the first sensor data, and the at least second sensor data.

In one embodiment, the system may be configured to automatically delete at least a pre-determined section of the at least one vibration signal.

The system may comprise at least one neural network component.

In one embodiment, the at least one neural network component may be configured to extract at least one feature map from at least one of the first sensor data, the at least processed sensor data, the at least second sensor data, and the at least second processed sensor dataset.

The at least one neural network component may be configured to automatically learn at least one lower-dimensional feature map.

The feature may be extracted on the basis of an observed environment of the sensor.

The neural network component may further be configured to associate at least one weight with at least one distinctive feature of the train.

In one embodiment, the at least one processing component may further be configured to generate at least one spectrogram from at least one of the first sensor data, the at least processed sensor data, the at least second sensor data, and the at least second processed sensor dataset.

The system may further be configured to generate the feature map preferably via unsupervised encoding of the at least one spectrogram.

In one embodiment, the at least one neural network component may be configured to down-sample the feature map preferably via convolution.

The at least one neural network component may comprise at least one convolutional neural network layer.

In one embodiment, the at least one processing component may further be configured to associate at least one activation function with the feature map.

The at least one processing component may further be configured to generate a label for the at least one subset of at least one of the first sensor data, the at least processed sensor data, the at least second sensor data, and the at least second processed sensor dataset.

The at least one processing component may be configured to predict at least one health status of at least one component of the passing train.

In one embodiment, the at least one processing component may be configured to generate at least one health status hypothesis of at the at least one component of the passing train.

The at least one component of the passing train may comprise at least one wheel.

In one embodiment, the health status hypothesis may comprise at least one flat wheel cause.

In one embodiment, the system may further be configured to generate at least one suggestion procedure, wherein the at least one suggestion procedure may comprise at least one action to remediate the at least one flat wheel.

In another embodiment, the system may be configured to display at least one message to prompt a user to implement at least one of the at least one suggestion procedure and/or at least one of the at least one action.

Moreover, the at least one server may be configured to execute at least one of predicting the at least one health status of the at least one component of the passing train, generating the at least one health status hypothesis of the at the at least one component of the passing train, generating the at least one suggestion procedure, wherein the at least one suggestion procedure may comprise the at least one action to remediate the at least one flat wheel, and prompting a user to implement the at least one of the at least one suggestion procedure and/or the at least one of the at least one action.

In one embodiment, the at least one server may comprise at least partially the at least one processing component.

In a third aspect, the invention relates to the use of the system as recited herein for carrying out the method as recited herein.

In one embodiment, the invention may comprise the use may comprise of the method and the system as recited herein for analyzing speed of at least one passing train.

In another embodiment, the invention may comprise the use of the method and the system according as recited herein for estimating the speed of the at least one railway.

In a further embodiment, the invention may comprise the use may comprise of the method and the system as recited herein for analyzing health status of at least one component of the passing train.

Additionally or alternatively, the invention may comprise the use may comprise of the method and the system as recited herein for identifying at least one axle comprising the health status of the at least one component of the passing train.

In a fifth aspect, the invention relates to a computer-implemented program comprising instructions which, when executed by a user-device, causes the user-device to carry out the method as recited herein.

In on embodiment, the invention may comprise the computer-implemented program comprising instructions which, when executed by a server, causes the server to carry out the method as recited herein.

In another embodiment, the invention may comprise the computer-implemented program comprising instructions which, when executed causes by a user-device, causes the user-device and a server to carry out the method as recited herein.

The present technology is also defined by the following numbered embodiments.

Below, method embodiments will be discussed. The letter M followed by a number abbreviates these embodiments. Whenever reference is herein made to method embodiments, these embodiments are meant.

M1. A method for analyzing properties related to a passing train on a railway network, the method comprising
    collecting a first sensor data of railway at a first time via a least one sensor arranged on the railway network,
    processing the first sensor data via at least one processing component to generate at least one processed sensor dataset, and
    estimating a value of at least one property related to the passing train based on the at least one processed sensor data to generate at least one property estimation of the passing train.

M2. The method according to the preceding embodiment, wherein the value of the at least one property of the passing train comprises a speed of the passing train, and wherein the at least one property estimation comprises at least one speed estimation of the passing train.

M3. The method according to any of the preceding embodiments, wherein the method further comprises predicting the speed of the passing train based on the at least one sensor data to generate at least one speed prediction of the passing train.

M4. The method according to the preceding embodiment, wherein the method further comprises connecting the at least one sensor to at least one server.

M5. The method according to any of the preceding embodiments, wherein the method comprises retrieving at least one vibration signal.

M6. The method according to the preceding embodiment, wherein the method further comprises extracting at least one Power Spectral Density (PSD) data set from the least one vibration signal.

M7. The method according to the preceding embodiment and with features of embodiments M3, wherein the at least one vibration signal returns a PSD as at least one-dimensional vector of a fixed size.

M8. The method according to the preceding embodiment, wherein the at least one vibration signal returns a PSD as a one-dimensional vector of a fixed size.

M9. The method according to any of the 2 preceding embodiments, wherein the at least one vibration signal comprises a signal frequency signal and a sampling rate, wherein the signal frequency is between 0 and 10,000 Hz, preferably between 50 and 8,000 Hz, more preferably between 100 and 5,000 Hz, and wherein the sampling rate is between 0 and 20 kHz, preferably between 0.1 and 8 kHz, more preferably between 1 and 5 kHz.

M10. The method according to embodiment M5, wherein the method comprises extracting at least one Mel spectrogram from the least one vibration signal.

M11. The method according to any of the preceding embodiments, wherein the method comprises mapping the data to generate a mapped data set.

M12. The method according to the preceding embodiment, wherein the method comprises curating the at least one estimation of the train speed based on the mapped data.

M13. The method according to any of the preceding embodiments, wherein the method comprises bidirectionally connecting the at least one sensor to the at least one server.

M14. The method according to any of the preceding embodiment, wherein the method comprises connecting the at least one server with the at least one processing component.

M15. The method according to any of the preceding embodiment, wherein at least one of the at least one server comprises at least partially one of the least one processing component.

M16. The method according to any of the preceding embodiments, wherein the method comprises facilitating the at least one sensor with a sensor processing component.

M17. The method according to any of the preceding embodiments, wherein the at least one processing component comprises a memory component configured to store at least one of the first sensor data, and the at least processed sensor dataset.

M18. The method according to any of the preceding embodiments, wherein the sensor processing component comprises a sensor memory component configured to store at least one of the first sensor data, and the processed sensor data.

M19. The method according to the preceding embodiment, wherein the method further comprises retrieving from the at least one sensor at least one of the first sensor data, and at least one sensor ID, supplying to the at least one server at least one of the first sensor data, and the at least one sensor ID, wherein the at least one sensor ID is related to the at least one sensor.

M20. The method according to any of the preceding embodiments and with features of embodiment M5, wherein the at least one vibration signal comprises at least one of:

at least frequency data;

at least displacement data;

at least velocity data;

at least acceleration data.

M21. The method according to any of the preceding embodiments, wherein the method further comprises automatically generating at least one acceleration trace associated with the first sensor data.

M22. The method according to any of the preceding embodiments, wherein the method comprises automatically transmitting to the at least one processing component at least one of the first sensor data, and the at least processed sensor dataset.

M23. The method according to any of the preceding embodiments, wherein the method comprises pre-processing the first sensor data via the at least processing component.

M24. The method according to the preceding embodiment and with features of embodiment M21, wherein the step of pre-processing further comprises at least one of:

flagging at least one noisy component of the first sensor data, removing at least one exponential wakeup, cutting off the edge of the at least one acceleration trace, stretching the at least one first sensor data to a predetermined size, representing the at least one first sensor data as a time-frequency spectrogram.

M25. The method according to the preceding embodiment, wherein the step of flagging comprises automatically deleting at least a pre-determined section of the acceleration trace.

M26. The method according to the preceding embodiment, wherein the method further comprises the step of automatically calculating the pre-determined section according to a type of the passing train.

M27. The method according to any of the preceding 3 embodiments, wherein the step of flagging further comprises altering the at least one acceleration trace when a root mean square (RMS) value of the acceleration is lower than a threshold value.

M28. The method according to any of the preceding embodiments and the features of M24, wherein the step of removing the exponential wakeup comprises alteration of an automatically pre-calculated number of acceleration trace/s from the acceleration trace.

M29. The method according to the preceding embodiment, wherein the method further comprises automatically identifying the pre-generated number preferably by fitting exponential curve to the acceleration trace and differentiating between a real signal and a wakeup curve.

M30. The method according to any of the preceding embodiments, wherein the method further comprises cleaning at least one additive noise, preferably by implementing a wiener filter.

M31. The method according to any of the preceding embodiments, wherein the method further comprises dynamically extracting at least one temporal and spectral content to standardize an output to a fixed size, and automatically converting the at least one acceleration trace to at least one time-frequency spectrogram.

M32. The method according to the preceding embodiment, wherein the method further comprises scaling the at least spectrogram value within a pre-determined region.

M33. The method according to the preceding embodiment, wherein the method comprises generating at least one spectrogram parameter preferably using hyperparameter optimization on at least one pre-determined truth dataset.

M34. The method according to any of the preceding embodiments, wherein the method further comprises facilitating the at least one processing component with at least one neural network component.

M35. The method according to any of the preceding embodiments and features of embodiment M23, wherein the method comprises feeding into the at least one neural network component at least one pre-processed dataset of the first sensor data.

M36. The method according to any of the preceding embodiments and with features of embodiment M37, wherein the at least one neural network comprises at least one convolutional neural network layer.

M37. The method according to any of the preceding embodiments, wherein the method comprises automatically extracting at least one feature map from at least one of the first sensor data, and the at least processed sensor dataset.

M38. The method according to any of the preceding embodiments and the features of embodiments M3 and M23, wherein the method comprises using the outcome of the pre-processing step for predicting the speed of the passing train.

M39. The method according to the preceding embodiment, wherein the method further comprises using the outcome of the pre-processing for embedding the at least one acceleration trace in the feature map.

M40. The method according to any of the preceding embodiments, wherein the method comprises automatically extracting a feature map related to an observed environment of the at least one sensor.

M41. The method according to any of the preceding embodiments and with features of embodiment M34, wherein the method comprises facilitating the at least one neural network component to automatically learn at least one lower-dimensional feature map.

M42. The method according to the preceding embodiment, wherein the method comprises teaching the at least one neural network component the at least one lower-dimensional feature map, wherein the method further comprises associating at least one weight with at least one distinctive feature of the passing train.

M43. The method according to any of the preceding embodiments, wherein the method further comprises unsupervised encoding of the at least one spectrogram to the at least one feature map.

M44. The method according to any of the preceding embodiments and with features of embodiment M35, wherein the method further comprises down-sampling of the feature map preferably via convolution.

M45. The method according to any of the preceding embodiments, wherein the method further comprises applying at least one activation function to the at least one feature map.

M46. The method according to any of the preceding embodiments, wherein the method comprises teaching the at least one neural network the at least one feature of the passing train using at least one training database.

M47. The method according to any of the preceding embodiments and features of embodiment M3, wherein the method comprises generating a health status hypothesis of at least one component of the passing train.

M48. The method according to the preceding embodiment, wherein the at least one component is at least one wheel of the passing train.

M49. The method according to the 2 preceding embodiments, wherein the health status hypothesis of the at least one wheel is used to identify a flat wheel.

M50. The method according to any of the 3 preceding embodiments, wherein the health status hypothesis further comprises at least one flat wheel cause.

M51. The method according to the preceding embodiment, wherein the method further comprises generating at least one suggestion procedure, wherein the at least one suggestion procedure comprises at least one action to remediate the at least one flat wheel.

M52. The method according to the preceding embodiment, wherein the method further comprises prompting a user to implement at least one of the at least one suggestion procedure and/or at least one of the at least one action.

M53. The method according to any of the preceding embodiments and with features of embodiment M21, wherein the method further comprises transforming the acceleration trace via at least one transforming approach of scaling, log scaling, variance normalization, Mel spectrogram, and sequence of power spectral density vectors, wherein the method comprises automatically generating a transformed acceleration trace dataset.

M54. The method according to the preceding embodiment, wherein the method comprises counting at least one of axle, and wagon, wherein the method comprises assigning a unique ID to each of the at least one axle and at least one wagon, wherein the unique ID is assigned based on a passing order, wherein the passing order comprises a passing sequence of the at least one axle and/or at least one wagon over the at least one sensor.

M55. The method according to the 2 preceding embodiments, wherein the counting is based upon transformed acceleration trace dataset.

M56. The method according to any of the preceding embodiments and with features of embodiment M54, wherein the method comprises collecting at least a second sensor data of railway at at-least a second time via the least one sensor arranged on the railway network, processing the at least second sensor data via the at least one processing component, and estimating at least a second value of the at least one property related to the passing train based on the at least second processed sensor data.

M57. The method according to the preceding embodiment, wherein the first sensor data is different from the at least second sensor data.

M58. The method according to any of the 2 preceding embodiments, wherein the first time is different from the at least second time.

M59. The method according to any of the 3 preceding embodiments and with features of embodiments M47, M49 or M50, wherein the method comprises tracking the health status of the at least one component of the passing train across at least 2 sensors.

M60. The method according to the preceding embodiment and with features of embodiments M47 and M54, wherein the health status hypothesis comprises information related to the at least one axle, wherein the method comprises estimating a specific axle of the passing train to generate a first axle finding,
    correlating the first axle finding to the unique ID of the at least one axle, and
    generating at least one final axle finding comprising the health status of the at least one axle.

M61. The method according to the preceding embodiment, wherein the method comprises automatically reporting the unique ID of the at least one axle comprising a flat wheel.

M62. The method according to the 2 preceding embodiments and with features of embodiment M59, wherein the method comprises automatically identifying the unique ID of the at least one axle comprising the flat wheel across the at least 2 sensors, preferably across at least 3 sensors, more preferably across at least 4 sensor components.

Below, system embodiments will be discussed. The letter S followed by a number abbreviates these embodiments. Whenever reference is herein made to sample detection system embodiments, these embodiments are meant.

S1. A system for analyzing properties related to a passing train on a railway network, the system comprising at least one sensor configured to measure at least one property related to the passing train,
    at least one processing component configured to process the at least one property related to the passing train,
    at least one analyzing component configured to analyze the at least one property related to the passing train, and
    at least one interface configured to access at least one server configured to be bidirectionally connected to the system, wherein the system is configured to estimate a value of the at least one property related to the passing train based on the at least one property.

S2. The system according to the preceding embodiment, wherein the system is configured to execute the method according to any of the preceding method embodiments.

S3. The system according to any of the 2 preceding embodiments, wherein the value of the at least one property related to the passing train comprises an estimate of the speed of the passing train.

S4. The system according to any of the preceding system embodiments, wherein the system is configured to establish a bidirectional communication between the at least one server and the at least one sensor.

S5. The system according to the preceding embodiment, wherein the system is further configured to enable a bidirectional data exchange between the at least one server and at least one of the least one sensor.

S6. The system according to any of the preceding system embodiments, wherein the at least one processing component is arranged on at least one of the at least one the server, and
    the at least the sensor.

S7. The system according to any of the preceding system embodiments, wherein the at least one processing component comprises at least one memory component configured to store at least one of the first sensor data,
    the at least processed sensor dataset,
    the at least second sensor data, and
    the at least second processed sensor dataset.

S8. The system according to any of the preceding system embodiments, wherein the first data comprises vibration signal associated with a motion of the passing train.

S9. The system according to any of the 2 the preceding embodiments, wherein the vibration signal comprises at least one of:

at least one frequency data;
    at least one displacement data;
    at least one velocity data;
    at least one acceleration data.

S10. The system according to any of the preceding system embodiments, wherein the at least one processing component is configured to pre-process at least one of the first sensor data, and
    the at least second sensor data.

S11. The system according to any of the preceding system embodiments, wherein the system is configured to automatically delete at least a pre-determined section of the at least one vibration signal.

S12. The system according to any of the preceding system embodiments, wherein the system comprises at least one neural network component.

S13. The system according to the preceding embodiment, wherein the at least one neural network component is configured to extract at least one feature map from at least one of the first sensor data,
    the at least processed sensor dataset,
    the at least second sensor data, and
    the at least second processed sensor dataset.

S14. The system according to the preceding embodiment, wherein the at least one neural network component is configured to automatically learn at least one lower-dimensional feature map.

S15. The system according to any of the preceding system embodiments, wherein the feature is extracted on the basis of an observed environment of the sensor.

S16. The system according to any of the preceding system embodiments, wherein the neural network component is further configured to associate at least one weight with at least one distinctive feature of the train.

S17. The system according to any of the preceding system embodiments, wherein the at least one processing component is further configured to generate at least one spectrogram from at least one of the first sensor data,
    the at least processed sensor dataset,
    the at least second sensor data, and
    the at least second processed sensor dataset.

S18. The system according to the preceding embodiment, wherein the system is further configured to generate the feature map preferably via unsupervised encoding of the at least one spectrogram.

S19. The system according to any of the preceding system embodiments, wherein the at least one neural network component is configured to down-sample the feature map preferably via convolution.

S20. The system according to any of the preceding embodiment and with features of embodiment 512, wherein the at least one neural network component comprises at least one convolutional neural network layer.

S21. The system according to any of the preceding system embodiments, wherein the at least one processing component is further configured to associate at least one activation function with the feature map.

S22. The system according to any of the preceding system embodiments, wherein the at least one processing component is further configured to generate a label for the at least one subset of at least one of the first sensor data, the at least processed sensor dataset, the at least second sensor data, and the at least second processed sensor dataset.

S23. The system according to the any of the preceding system embodiments, wherein the at least one processing component is configured to predict at least one health status of at least one component of the passing train.

S24. The system according to the preceding embodiment, wherein the at least one processing component is configured to generate at least one health status hypothesis of at the at least one component of the passing train.

S25. The system according to the preceding embodiment, wherein the at least one component of the passing train comprises at least one wheel.

S26. The system according to the preceding embodiment, wherein the health status hypothesis comprises at least one flat wheel cause.

S27. The system according to the preceding embodiment, wherein the system is further configured to generate at least one suggestion procedure, wherein the at least one suggestion procedure comprises at least one action to remediate the at least one flat wheel.

S28. The system according to the preceding embodiment, wherein the system is configured to display at least one message to prompt a user to implement at least one of the at least one suggestion procedure and/or at least one of the at least one action.

S29. The system according to any of the preceding system embodiments and with features of the 5 preceding embodiments, wherein the at least one server is configured to execute at least one of predicting the at least one health status of the at least one component of the passing train, generating the at least one health status hypothesis of the at the at least one component of the passing train, generating the at least one suggestion procedure, wherein the at least one suggestion procedure comprises the at least one action to remediate the at least one flat wheel, and prompting a user to implement the at least one of the at least one suggestion procedure and/or the at least one of the at least one action.

S30. The system according to any of the preceding system embodiments, wherein the at least one server comprises at least partially the at least one processing component.

Below, use embodiments will be discussed. These embodiments are abbreviated by the letter "U" followed by a number. Whenever reference is herein made to "use embodiments", these embodiments are meant.

U1. Use of the system according to any of the preceding embodiments, for carrying out the method according to any of the preceding method embodiments.

U2. Use of the method according to any of the preceding method embodiments and the system according to any of the preceding embodiments, for analyzing speed of at least one passing train.

U3. Use of the method according to any of the preceding method embodiments and the system according to any of the preceding embodiments, for estimating the speed of the passing train.

U4. Use of the method according to any of the preceding method embodiments and the system according to any of the preceding embodiments, for analyzing health status of at least one component of the passing train.

U5. Use of the method according to any of the preceding method embodiments and the system according to any of the preceding embodiments, for identifying at least one axle comprising the health status of the at least one component of the passing train.

Below, program embodiments will be discussed. These embodiments are abbreviated by the letter "C" followed by a number. Whenever reference is herein made to "program embodiments", these embodiments are meant.

C1. A computer-implemented program comprising instructions which, when executed by a user-device, causes the user-device to carry out the method steps according to any of the preceding method embodiments.

C2. A computer-implemented program comprising instructions which, when executed by a server, causes the server to carry out the method steps according to any of the preceding method embodiments.

C3. A computer-implemented program comprising instructions which, when executed causes by a user-device, causes the user-device and a server to carry out the method steps according to any of the preceding method embodiments.

DETAILED DESCRIPTION OF THE DRAWINGS

It is noted that not all the drawings carry all the reference signs. Instead, in some of the drawings, some of the reference signs have been omitted for sake of brevity and simplicity of illustration. Embodiments of the present invention will now be described with reference to the accompanying drawings.

Figure 1:
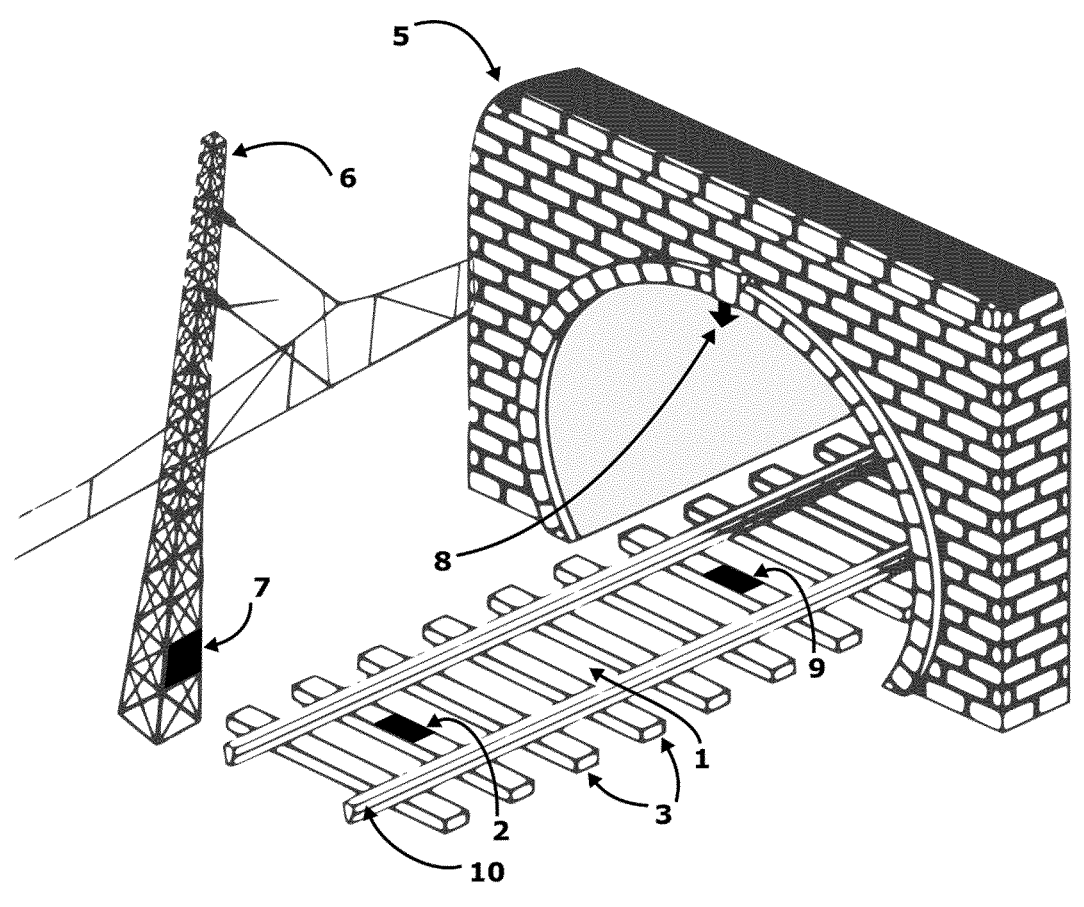
FIG. 1 depicts a schematic representation of a railway network and system arranged at the railway network.

FIG. 1 depicts a schematic representation of a railway network and system arranged at the railway network. In simple terms, the system may comprise a railway section with the railway 1 itself, comprising rails 10 and sleepers 3. Instead of the sleepers 3 also a solid bed for the rails 10 can be provided.

Moreover, a further example of constitutional elements is conceptually represented a mast, conceptually identified by reference numeral 6. Such constitutional elements are usually arranged at or in the vicinity of railways. Furthermore, a tunnel is shown, conceptually identified by reference numeral 5. It is needless to say that other constructions, buildings etc. may be present and also used for the present invention as described before and below.

For instance, a first sensor 2 can be arranged on one or more of the sleepers. The sensor 2 can be an acceleration sensor and/or any other kind of railway specific sensor. Examples have been mentioned before.

Further, a second sensor 9 can also arranged on another sleeper distant from the first sensor 2. Although it seems just a small distance in the present example, those distances can range from the distance to the neighboring sleeper to one or more kilometers. Other sensors can be used for attachment to the sleepers as well. The sensors can further be of different kind—such as where the first sensor 2 may be an acceleration sensor, the second sensor 9 can be a magnetic sensor or any other combination suitable for the specific need. The variety of sensors are enumerated before.

Another sensor 7, which may be different or the same kind of sensor, can be attached, for example, to the mast 6 or any other structure. This may be a different kind of sensor, such as, for example, an optical, temperature, even acceleration sensor, etc. A further kind of sensor, for example sensor 8, can be arranged above the railway as at the beginning or within the tunnel 5. This could, for example, be a height sensor for determining the height of a train, an optical sensor, a doppler sensor etc. It will be understood that all those sensors mentioned here and/or before are just non-limiting examples.

Furthermore, the sensors can be configured to submit the sensor data via a communication network, such as a wireless communication network. As the communication network bears several advantages and disadvantages regarding availability, transmittal distance, costs etc. the transmittal of sensor data is optimized as described herein before and below.

Figure 2:
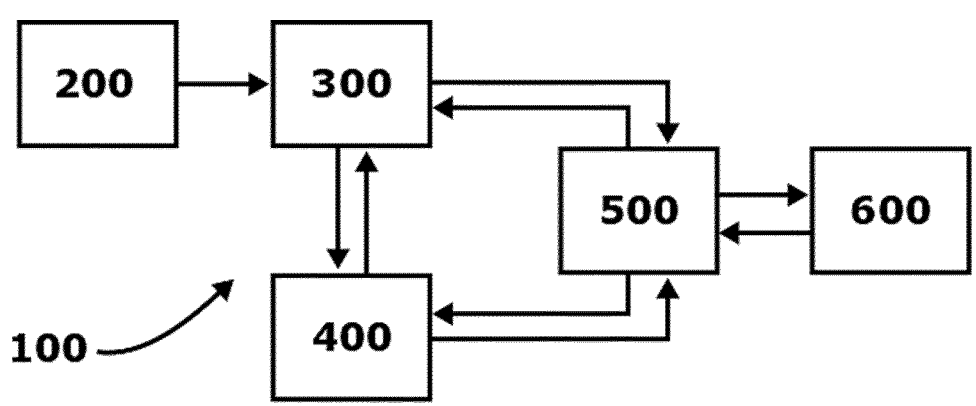
FIG. 2 depicts a schematic representation of a system for monitoring a passing train on railway network according to embodiments of the present invention.

FIG. 2 depicts a system 100 for monitoring a passing train on railway network. In simple terms, the system 100 may comprise a sensor component 200, a processing component 300, a storing component 400, an analyzing component 500 and a server 600.

In one embodiment, the sensor component 200 may comprise a plurality of sensor units, and each may comprise a plurality of sensor nodes. Therefore, the sensor component 200 may also be referred to as a plurality of sensor components 200 or simply as sensor 200 Additionally or alternatively, the sensor component 200 may be arranged on the railway network and/or an infrastructure of the railway network, such as, for example, on rails. On another embodiment, the sensor 200 may a remote sensor.

Additionally, or alternatively, the sensor component 200 may be configured to sample information relevant to a railway network, for instance, the sensor component may be configured to record a vibration signal of a passing train on the railway network.

In one embodiment, the processing 300 component may comprise a standalone component configured to retrieve information from the sensor 200. Additionally, or alternatively, the processing component may be configured to bidirectionally communicate the storing component 300 and the analyzing component 500. For instance, the processing component 300 may transfer raw sensor data to the storing component 400, wherein the raw sensor data may be stored until the processing component 300 may require said data for processing to generate a processed sensor data. In another embodiment, the processing component 300 may also transfer processed sensor data to the storing component

400. In a further embodiment, the processing component may also retrieve data from the storing component 400.

In one embodiment, the analyzing component 500 may be configured to bidirectionally communicate with the processing component 300, the storing component 400 and/or the server 600. It will be understood that the communication of the analyzing component 500 with the other components may take place independent and/or simultaneously one from another.

In one embodiment, the processing component 300 may also be integrated with at least one of the sensors 200. In order words, the processing component 300 may also comprise an imbedded module of the sensors 200 or at least a module of the processing component 300 may be comprise by the sensors 200.

In embodiment, the analyzing component 500 may be configured to process sensor data based on at least one analytical approach, each approach comprising at least one of signal filter processing, pattern recognition, probabilistic modeling, Bayesian schemes, machine learning, supervised learning, unsupervised learning, reinforcement learning, statistical analytics, statistical models, principle component analysis, independent component analysis (ICA), dynamic time warping, maximum likelihood estimates, modeling, estimating, neural network, convolutional network, deep convolutional network, deep learning, ultra-deep learning, genetic algorithms, Markov models, and/or hidden Markov models.

The server 600 may comprise one or more modules configured to receive information from the analyzing component 500.

In another embodiment of the presentation invention, the sensor 200, the processing component 300, the storing component 400 and the analyzing component may comprise an integrated module configured to execute subsequently the tasks corresponding to each individual components, and transfer a final processed analyzed sensor data to the server 600. In simple words, in one embodiment the sensor 200, the processing component 300, the storing component 400 and the analyzing component 500 may comprises modules of a single component.

In one embodiment, the server 600 may retrieve information from the analyzing component 500, and further may provide information to the analyzing component 500, for example, information as regards a passing train, such as, inter alia, the speed of the passing train or whether the passing train has one or more flat wheels or not. It will be understood that each component may receive a plurality of operation parameters, for instance, the processing component 300 may be commanded to execute a pre-processing of the data received from the sensors 200.

Alternatively or additionally, the processing component 300 may be instructed to transmit the original data received from the sensors 200, i.e. the data coming from the sensors 200 can be transferred directly to the next component without executing any further task. It will be understood that the component may also be configured to perform a plurality of tasks at the same time, e.g. processing the data coming from the sensor 200 before transferring to the next component and transferring the data coming from the sensors 200 without any processing.

In one embodiment, the server 600 may comprise a cloud server, a remote server and/or a collection of different type of servers. Therefore, the server 600 may also be referred to as cloud server 600, remote server 600, or simple as servers 500. In another embodiment, the servers 500 may also converge in a central server.

It will be understood that the server 600 may also be in bidirectional communication with the storing component 400, the processing component or the sensor component 200 without passing through the analyzing component 500 or any other intermediate component. For this purpose, each component may also comprise a remote communication unit configured to establish a remote communication between a component, e.g. sensor component 200, with the server 600.

The storing component 400 may be configured to receive information from the server 600 for storage. In simple words, the storing component 400 may store information provided by the servers 600. The information provided by the server 600 may include, for example, but not limited to, data obtained by sensors 200, data processed by the processing component 500 and any additional data generated in the servers 600. It will be understood that the servers 600 may be granted access to the storing component 400 comprising, inter alia, the following permissions, reading the data allocated in the storing component 400, writing and overwriting the data stored in the storing component 400, control and modify the storage logic and the data distribution within the storing component 400.

In one embodiment of the present invention the server 600 may be configured transmit a signal to other component of the railway system based upon health status information retrieved from sensors 200. For instance, a giving health status data is provided by the server 600 and subsequently the server 600 generates a signal containing instructions, which are transmitted to the railway system for implementation. The set of instructions may comprise, inter alia, generating a hypothesis as regards the health status of at least one component of the passing train and/or a failure hypothesis such as the occurrence of one or more flat wheels, which may comprise instructions to be implemented. Furthermore, the signal may be based on at least one analytical approach, each approach comprising at least one of signal filter processing, pattern recognition, probabilistic modeling, Bayesian schemes, machine learning, supervised learning, unsupervised learning, reinforcement learning, statistical analytics, statistical models, principle component analysis, independent component analysis (ICA), dynamic time warping, maximum likelihood estimates, modeling, estimating, neural network, convolutional network, deep convolutional network, deep learning, ultra-deep learning, genetic algorithms, Markov models, and/or hidden Markov models.

In one embodiment, the sensors 200 may, inter alia, adopt a configuration that allows identifying passing trains, record a vibration signal associated to the identified passing trains and consequently or subsequently estimate and/or predict their speeds and, for instance, a defect on the passing trains such as one or more flat wheels. The data gathered by the sensors 200 may constitute the basis for the server 600 to generate instructions for the activation of actions. In simple words, if a train is circulating on the network or passing by a given part of the network, the sensors 200 may retrieve data that may allow calculating, estimating and/or predicting their speed. The data gathered by the sensors 200 may be communicated to the server 600, which may subsequently transmit the information and the corresponding instructions to the nearest assets that may be affected by the passing train, for example, the nearest switch, which may consequently be activated to control the traffic on the tracks. Furthermore, in one embodiment of the present invention, the system 100 may estimate the health status of components of the railway network and may further generate a health status and/or failure hypothesis that may allow to forecast the suitability of the component of the railway network to allocate the passing train based upon the calculated, estimated and/or predicted speed of the passing rolling units. Such hypothesis may be based on at least one analytical approach, each approach comprising at least one of signal filter processing, pattern recognition, probabilistic modeling, Bayesian schemes, machine learning, supervised learning, unsupervised learning, reinforcement learning, statistical analytics, statistical models, principle component analysis, independent component analysis (ICA), dynamic time warping, maximum likelihood estimates, modeling, estimating, neural network, convolutional network, deep convolutional network, deep learning, ultra-deep learning, genetic algorithms, Markov models, and/or hidden Markov models.

In another embodiment of the present invention, the system 100 may determine that a particular part and/or component of the passing train, for instance, one or more wheels, is required to be replaced and/or maintain before a given date to avoid failure of the passing train or to avoid affecting the railway network, such as its traffic.

In one embodiment of the present invention, the system 100 may also determine that a particular rolling stock may pass through a component or portion of the railway network requiring maintenance, reparation or replacement, however, due to work schedule it may be prompt to failure if an inadequate rolling unit passes through. This approach may be advantageous, as it may allow to reduce failure of railway networks, which may be achieved by monitoring, evaluating and forecasting optimal operation conditions of the railway network.

Figure 3:
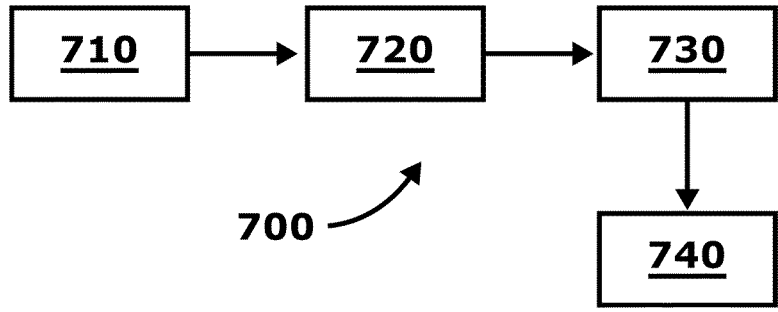
FIG. 3 depicts an example application of a method for monitoring a passing train in a railway network using components of the system according to embodiments of the present invention.

FIG. 3 schematically depicts an example application of a method 700 for monitoring a passing train in a railway network using components of the system 100. In simple terms the method 700 may comprise a plurality of steps, such as, for example, but not limited to, a first step 710 that may comprise recording data related to a passing train by means of a sensor component 200, a second step 720 that may comprise extracting features related to the passing train from the data recording in the first step 710, a third step 730 that may comprise fitting the extracted features to at least one property of the passing train and a fourth step 740 that may comprise estimating at least one property of the passing train based on the extracted and fitted features.

The step 720 may be performed by means of the processing component 300 and the step 730 and 740 may be performed by means of the analyzing component 500. In one embodiment, the steps 740 may also be performed by means of the server 600.

In more simple words, the method 700 may comprise a sensor recording step 710, wherein the sensor component 200 may be configured to record and/or measure a signal, such as, for example, a vibration signal. Subsequently, the method 700 may comprise in the second step 720 extracting features from the vibration signal such as acceleration using for instance a power spectral density approach, such as, for example, a power spectral density evolution as a function of speed train. In the third step 730, the extracted features may be correlated to a plurality of properties of the passing train, for example, using machine learning. In a following step 740, the correlated features may be used to calculate, estimate and/or predict concrete properties of the passing train, such as the train speed. These correlated features may also be used to determine the health status of one or more component of the passing train, for example, to estimate or predict the present of a flat wheel. In some embodiments, specific flat wheels can be identified in addition to determining the presence or not of flat wheels. It should be understood that the method 700 may also use other type of spectrograms, for instance, Mel spectrograms.

Figure 4:
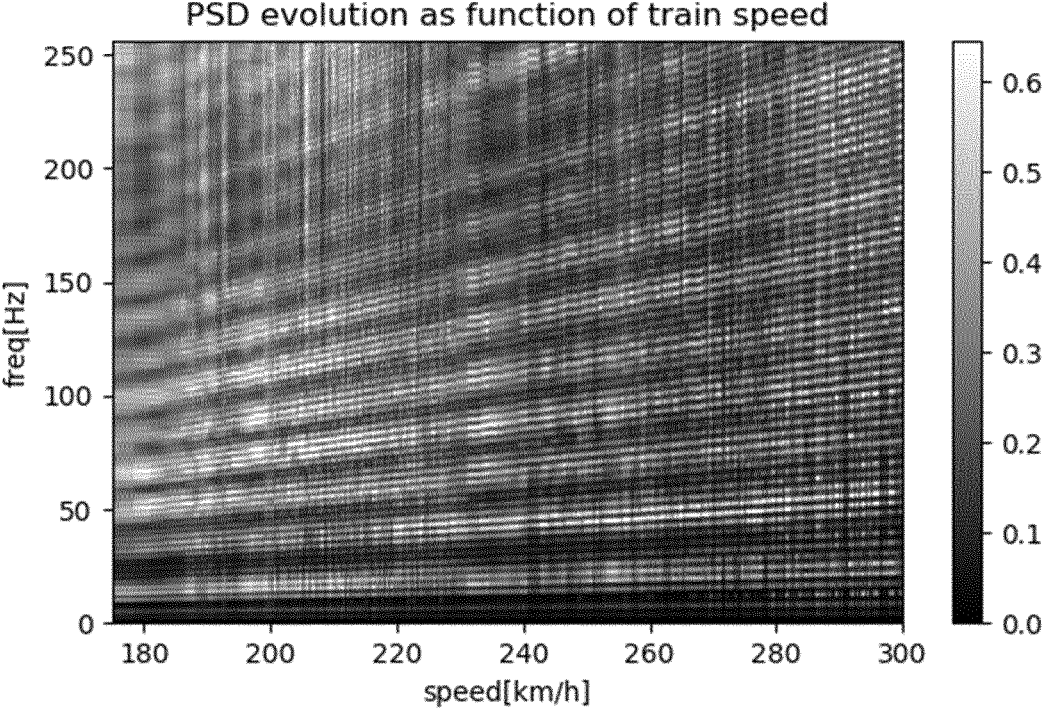
FIG. 4 depicts an example of a plot comprising PSD data.

FIG. 4 depicts an example of a plot comprising PSD data. In simple terms, the plot shows a relationship between a frequency content of many vibration signal recordings stemming from one specific train type passing over a one sensor. Each vertical line represents a PSD from one such recording, with the position along the x-axis denoting the train speed of the passing train, and the y-axis denoting the power at the different frequencies. Moreover, the plot depicts an evidence for the relationship between frequency content and train speed, which, for instance, in the present invention may be used to predict the train speed from the vibration signal according to embodiments of the present invention.

Figure 5:
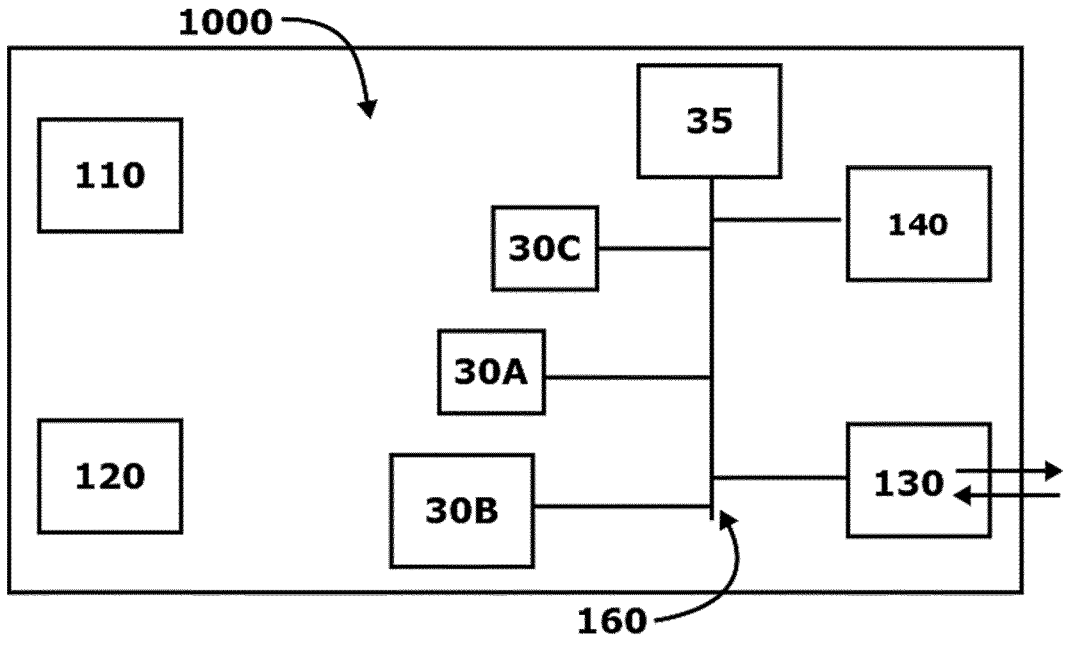
FIG. 5 depicts a schematic of a computing device.

FIG. 5 depicts a schematic of a computing device 1000. The computing device 1000 may comprise a computing unit 35, a first data storage unit 30A, a second data storage unit 30B and a third data storage unit 30C.

The computing device 1000 can be a single computing device or an assembly of computing devices. The computing device 1000 can be locally arranged or remotely, such as a cloud solution.

On the different data storage units 30 the different data can be stored, such as the genetic data on the first data storage 30A, the time stamped data and/or event code data and/or phenotypic data on the second data storage 30B and privacy sensitive data, such as the connection of the before-mentioned data to an individual, on the thirds data storage 30C.

Additional data storage can be also provided and/or the ones mentioned before can be combined at least in part. Another data storage (not shown) can comprise data specifying for instance, air temperature, rail temperature, position of blades, model of point machine, position of point machine and/or further railway network related information. This data can also be provided on one or more of the before-mentioned data storages.

The computing unit 35 can access the first data storage unit 30A, the second data storage unit 30B and the third data storage unit 30C through the internal communication channel 160, which can comprise a bus connection 160.

The computing unit 30 may be single processor or a plurality of processors, and may be, but not limited to, a CPU (central processing unit), GPU (graphical processing unit), DSP (digital signal processor), APU (accelerator processing unit), ASIC (application-specific integrated circuit), ASIP (application-specific instruction-set processor) or FPGA (field programmable gate array). The first data storage unit 30A may be singular or plural, and may be, but not limited to, a volatile or non-volatile memory, such as a random access memory (RAM), Dynamic RAM (DRAM), Synchronous Dynamic RAM (SDRAM), static RAM (SRAM), Flash Memory, Magneto-resistive RAM (MRAM), Ferroelectric RAM (F-RAM), or Parameter RAM (P-RAM).

The second data storage unit 30B may be singular or plural, and may be, but not limited to, a volatile or non-volatile memory, such as a random access memory (RAM), Dynamic RAM (DRAM), Synchronous Dynamic RAM (SDRAM), static RAM (SRAM), Flash Memory, Magneto-resistive RAM (MRAM), Ferroelectric RAM (F-RAM), or Parameter RAM (P-RAM). The third data storage unit 30C may be singular or plural, and may be, but not limited to, a volatile or non-volatile memory, such as a random access memory (RAM), Dynamic RAM (DRAM), Synchronous Dynamic RAM (SDRAM), static RAM (SRAM), Flash Memory, Magneto-resistive RAM (MRAM), Ferroelectric RAM (F-RAM), or Parameter RAM (P-RAM).

It should be understood that generally, the first data storage unit 30A (also referred to as encryption key storage unit 30A), the second data storage unit 30B (also referred to as data share storage unit 30B), and the third data storage unit 30C (also referred to as decryption key storage unit 30C) can also be part of the same memory. That is, only one general data storage unit 30 per device may be provided, which may be configured to store the respective encryption key (such that the section of the data storage unit 30 storing the encryption key may be the encryption key storage unit 30A), the respective data element share (such that the section of the data storage unit 30 storing the data element share may be the data share storage unit 30B), and the respective decryption key (such that the section of the data storage unit 30 storing the decryption key may be the decryption key storage unit 30A).

In some embodiments, the third data storage unit 30C can be a secure memory device 30C, such as, a self-encrypted memory, hardware-based full disk encryption memory and the like which can automatically encrypt all of the stored data. The data can be decrypted from the memory component only upon successful authentication of the party requiring to access the third data storage unit 30C, wherein the party can be a user, computing device, processing unit and the like. In some embodiments, the third data storage unit 30C can only be connected to the computing unit 35 and the computing unit 35 can be configured to never output the data received from the third data storage unit 30C. This can ensure a secure storing and handling of the encryption key (i.e. private key) stored in the third data storage unit 30C.

In some embodiments, the second data storage unit 30B may not be provided but instead the computing device 1000 can be configured to receive a corresponding encrypted share from the database 60. In some embodiments, the computing device 1000 may comprise the second data storage unit 30B and can be configured to receive a corresponding encrypted share from the database 60.

The computing device 1000 may comprise a further memory component 140 which may be singular or plural, and may be, but not limited to, a volatile or non-volatile memory, such as a random access memory (RAM), Dynamic RAM (DRAM), Synchronous Dynamic RAM (SDRAM), static RAM (SRAM), Flash Memory, Magneto-resistive RAM (MRAM), Ferroelectric RAM (F-RAM), or Parameter RAM (P-RAM). The memory component 140 may also be connected with the other components of the computing device 1000 (such as the computing component 35) through the internal communication channel 160.

Further the computing device 1000 may comprise an external communication component 130. The external communication component 130 can be configured to facilitate sending and/or receiving data to/from an external device (e.g. backup device 10, recovery device 20, database 60). The external communication component 130 may comprise an antenna (e.g. WIFI antenna, NFC antenna, 2G/3G/4G/5G antenna and the like), USB port/plug, LAN port/plug, contact pads offering electrical connectivity and the like. The external communication component 130 can send and/or receive data based on a communication protocol which can comprise instructions for sending and/or receiving data. Said instructions can be stored in the memory component 140 and can be executed by the computing unit 35 and/or external communication component 130. The external communication component 130 can be connected to the internal communication component 160. Thus, data received by the external communication component 130 can be provided to the memory component 140, computing unit 35, first data storage unit 30A and/or second data storage unit 30B and/or third data storage unit 30C. Similarly, data stored on the memory component 140, first data storage unit 30A and/or second data storage unit 30B and/or third data storage unit 30C and/or data generated by the commuting unit 35 can be provided to the external communication component 130 for being transmitted to an external device.

In addition, the computing device 1000 may comprise an input user interface 110 which can allow the user of the computing device 1000 to provide at least one input (e.g. instruction) to the computing device 100. For example, the input user interface 110 may comprise a button, keyboard, trackpad, mouse, touchscreen, joystick and the like.

Additionally, still, the computing device 1000 may comprise an output user interface 120 which can allow the computing device 1000 to provide indications to the user. For example, the output user interface 110 may be a LED, a display, a speaker and the like.

The output and the input user interface 100 may also be connected through the internal communication component 160 with the internal component of the device 100.

The processor may be singular or plural, and may be, but not limited to, a CPU, GPU, DSP, APU, or FPGA. The memory may be singular or plural, and may be, but not limited to, being volatile or non-volatile, such an SDRAM, DRAM, SRAM, Flash Memory, MRAM, F-RAM, or P-RAM.

The data processing device can comprise means of data processing, such as, processor units, hardware accelerators and/or microcontrollers. The data processing device 20 can comprise memory components, such as, main memory (e.g. RAM), cache memory (e.g. SRAM) and/or secondary memory (e.g. HDD, SDD). The data processing device can comprise busses configured to facilitate data exchange between components of the data processing device, such as, the communication between the memory components and the processing components. The data processing device can comprise network interface cards that can be configured to connect the data processing device to a network, such as, to the Internet. The data processing device can comprise user interfaces, such as:

output user interface, such as:
  screens or monitors configured to display visual data (e.g. displaying graphical user interfaces of railway network status),
  speakers configured to communicate audio data (e.g. playing audio data to the user),
input user interface, such as:
  camera configured to capture visual data (e.g. capturing images and/or videos of the user),
  microphone configured to capture audio data (e.g. recording audio from the user),
  keyboard configured to allow the insertion of text and/or other keyboard commands (e.g. allowing the user to enter text data and/or other keyboard commands by having the user type on the keyboard) and/or trackpad, mouse, touchscreen, joystick—configured to facilitate the navigation through different graphical user interfaces of the questionnaire.

The data processing device can be a processing unit configured to carry out instructions of a program. The data processing device can be a system-on-chip comprising processing units, memory components and busses. The data processing device can be a personal computer, a laptop, a pocket computer, a smartphone, a tablet computer. The data processing device can be a server, either local and/or remote. The data processing device can be a processing unit or a system-on-chip that can be interfaced with a personal computer, a laptop, a pocket computer, a smartphone, a tablet computer and/or user interface (such as the upper-mentioned user interfaces).

While in the above, a preferred embodiment has been described with reference to the accompanying drawings, the skilled person will understand that this embodiment was provided for illustrative purpose only and should by no means be construed to limit the scope of the present invention, which is defined by the claims.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. A method for analyzing properties related to a passing train on a railway network, the method comprising
  collecting a first sensor data of railway at a first time via at least one sensor arranged on the railway network, wherein the first sensor data comprises a vibration signal, wherein the at least one vibration signal comprises a signal frequency and a sampling rate, wherein the signal frequency is between 0 and 10,000 Hz and wherein the sampling rate is between 0 and 20 kHz,
  processing the first sensor data via at least one processing component to generate at least one processed sensor dataset, wherein the processing comprises extracting at least one Power Spectral Density (PSD) data set from the least one vibration signal and/or extracting at least one Mel spectrogram from the least one vibration signal, and
  estimating at least a speed of the passing train based on the at least one Power Spectral Density (PSD) data set and/or the at least one Mel spectrogram.

2. The method according to claim 1, further comprising:
  mapping the first sensor data to generate a mapped data set, and
  curating the at least one estimation of the train speed based on the mapped data.

3. The method according to claim 1, wherein the signal frequency is between 50 and 8,000 Hz.

4. The method according to claim 1, wherein the signal frequency is between 100 and 5,000 Hz.

5. The method according to claim 1, wherein the sampling rate is between 0.1 and 8 KHz.

6. The method according to claim 1, wherein the sampling rate is between 1 and 5 kHz.

7. The method according to claim 1, wherein the method further comprises bidirectionally connecting the at least one sensor to at least one server, and connecting the at least one server with the at least one processing component.

8. The method according to claim 7, further comprising retrieving from the at least one sensor at least one of the first sensor data, and at least one sensor ID, supplying to the at least one server at least one of the first sensor data, or the at least one sensor ID, wherein the at least one sensor ID is related to the at least one sensor.

9. The method according to claim 1, wherein the at least one vibration signal comprises at least one of:

at least frequency data;

at least displacement data;

at least velocity data; or at least acceleration data, further comprising automatically generating at least one acceleration trace associated with the first sensor data based on the at least one vibration signal.

10. The method according to claim 9, further comprising pre-processing the first sensor data via the at least processing component, wherein the step of pre-processing further comprises at least one of:

flagging at least one noisy component of the first sensor data, removing at least one exponential wakeup, cutting off the edge of the at least one acceleration trace, or stretching the at least one first sensor data to a pre-determined size, representing the at least one first sensor data as a time-frequency spectrogram.

11. The method according to claim 10, wherein the health status hypothesis comprises information related to the at least one axle, the method further comprises:

estimating a specific axle of the passing train to generate a first axle finding, correlating the first axle finding to the unique ID of the at least one axle, generating at least one final axle finding comprising the health status of the at least one axle, automatically reporting the unique ID of the at least one axle comprising a flat wheel, and automatically identifying the unique ID of the at least one axle comprising the flat wheel across the at least 2 sensors.

12. The method according to claim 9, further comprising:

dynamically extracting at least one temporal and spectral content to standardize an output to a fixed size, and automatically converting the at least one acceleration trace to at least one time-frequency spectrogram.

13. The method according to claim 1, further comprising generating a health status hypothesis of at least one component of the passing train, wherein the at least one component is at least one wheel of the passing train, and wherein the health status hypothesis of the at least one wheel is used to identify a flat wheel.

14. The method according to claim 13, further comprising counting at least one of axle, and wagon, wherein the method comprises assigning a unique ID to each of the at least one axle and at least one wagon, wherein the unique ID is assigned based on a passing order, wherein the passing order comprises a passing sequence of the at least one axle and/or at least one wagon over the at least one sensor.

15. The method according to claim 1, further comprising:

collecting at least a second sensor data of railway at at-least a second time via the least one sensor arranged on the railway network, processing the at least second sensor data via the at least one processing component, and estimating at least a second value of the at least one property related to the passing train based on the at least second processed sensor data wherein the method comprises tracking the health status of the at least one component of the passing train across at least 2 sensors.

16. A system for analyzing properties related to a passing train on a railway network, the system comprising at least one sensor configured to measure at least one property related to the passing train, at least one processing component configured to process the at least one property related to the passing train, at least one analyzing component configured to analyze the at least one property related to the passing train, and at least one interface configured to access at least one server configured to be bidirectionally connected to the system, wherein the system is configured to estimate a value of the at least one property related to the passing train based on the at least one property, and execute the method according to claim 1.

17. The system according to claim 16, wherein the system is configured to establish a bidirectional communication between the at least one server and the at least one sensor, and wherein the at least one processing component is configured to generate at least one health status hypothesis of at the at least one component of the passing train, wherein the at least one server is configured to execute at least one of predicting the at least one health status of the at least one component of the passing train, generating the at least one health status hypothesis of the at the at least one component of the passing train, generating the at least one suggestion procedure, wherein the at least one suggestion procedure comprises the at least one action to remediate the at least one flat wheel, and prompting a user to implement the at least one of the at least one suggestion procedure and/or the at least one of the at least one action.

\* \* \* \* \*